US006593005B2

(12) United States Patent
Tau et al.

(10) Patent No.: US 6,593,005 B2
(45) Date of Patent: Jul. 15, 2003

(54) COMPOSITION AND FILMS THEREOF

(75) Inventors: Li-Min Tau, Lake Jackson, TX (US); Lisa S. Madenjian, Lake Jackson, TX (US); Johan A. Thoen, Terneuzen (NL); Wendy D. Hoenig, Lake Jackson, TX (US); Pak-Wing S. Chum, Lake Jackson, TX (US); John Kaarto, Verdun (CA); Daniel J. Falla, Sarnia (CA)

(73) Assignee: Dow Global Technologies Inc., Midland, MI (US)

( * ) Notice: Subject to any disclaimer, the term of this patent is extended or adjusted under 35 U.S.C. 154(b) by 14 days.

(21) Appl. No.: 09/769,129

(22) Filed: Jan. 24, 2001

(65) Prior Publication Data

US 2001/0046606 A1 Nov. 29, 2001

Related U.S. Application Data

(60) Provisional application No. 60/177,781, filed on Jan. 24, 2000, provisional application No. 60/211,048, filed on Jun. 12, 2000, provisional application No. 60/232,977, filed on Sep. 14, 2000, and provisional application No. 60/257,513, filed on Dec. 22, 2000.

(51) Int. Cl.[7] .............................................. B32B 27/32

(52) U.S. Cl. ........................ 428/516; 428/213; 428/515

(58) Field of Search .................................. 428/213, 516

(56) References Cited

U.S. PATENT DOCUMENTS

| 3,058,944 A | 10/1962 | Breslow et al. ............... 260/41 |
| 3,203,936 A | 8/1965 | Breslow et al. ............. 260/79.3 |
| 3,203,937 A | 8/1965 | Breslow et al. ............. 260/79.3 |
| 3,282,864 A | 11/1966 | Bost et al. .................... 260/2.5 |
| 3,298,975 A | 1/1967 | Feild et al. ................... 260/2.5 |

(List continued on next page.)

FOREIGN PATENT DOCUMENTS

| CA | 797 917 | 10/1968 | .................. 401/51 |
| CA | 1 024 296 | 1/1978 | ................. 402/325 |
| CA | 1 219 389 | 3/1987 | ................. 400/300 |
| DE | 1 569 025 | 7/1970 | |
| EP | 0 351 208 | 1/1990 | |

(List continued on next page.)

OTHER PUBLICATIONS

R. A. Abramovitch, "Polar Radicals in Aromatic Substitution", *Intra–Science Chemistry Reports*, pp. 211–218, 1969.
R. A. Abramovitch et al., "Reaction of Sulphonyl Azides with Unstrained Olefins", *J. Chem. Soc.*, pp. 2169–2172, 1974.
R. A. Abramovitch et al, Intramolecular Insertion of Arylsulfonylnitrenes into Aliphatic Side Chains, *J. Org. Chem.*, vol. 42, No. 17, pp. 2920–2926, 1977.
R. A. Abramovitch et al., "Pyrolysis of Phenylaikylsulphonyl Azides and 2–phenethyl Azidofomate. Selectivity of Sulphonylnitrenes and Contrast between Sulphonyl– and Carbonyl–nitrenes", *J. Chem. Soc. Chem. Commun.*, pp. 1087–1088, 1981.

(List continued on next page.)

*Primary Examiner*—D. S. Nakarani

(57) ABSTRACT

The present invention includes a coextruded film having at least two layers. The first layer contains a coupled propylene polymer and the second layer contains an in-reactor blend of a linear low density polyethylene fraction and a substantially linear polyethylene fraction. Alternatively, the second layer may include a homogeneously branched linear polyethylene. Preferably, the first layer makes up about 50 weight percent or less of the overall coextruded film structure. The first layer may also contain a polyethylene, such as a linear low density polyethylene, a low density polyethylene, a high density polyethylene, substantially linear polyethylene, a homogeneously branched linear polyethylene, an in-reactor blend of linear low density polyethylene and a substantially linear polyethyelene, and blends thereof.

46 Claims, 2 Drawing Sheets

U.S. PATENT DOCUMENTS

| | | | |
|---|---|---|---|
| 3,336,268 A | 8/1967 | Cox | 260/79.3 |
| 3,341,480 A | 9/1967 | Feild | 260/2.5 |
| 3,377,415 A | 4/1968 | Oppenlander | 264/210 |
| 3,389,198 A | 6/1968 | Taber | 264/52 |
| 3,530,108 A | 9/1970 | Oppenlander | 260/93.7 |
| 3,645,992 A | 2/1972 | Elston | 260/80.78 |
| 3,687,920 A | 8/1972 | Johnson | 260/88.2 |
| 3,893,989 A | 7/1975 | Leicht et al. | 260/93.7 |
| 3,914,342 A | 10/1975 | Mitchell | 260/897 |
| 3,959,425 A | 5/1976 | Herrington | 264/89 |
| 4,003,712 A | 1/1977 | Miller | 23/288 |
| 4,076,698 A | 2/1978 | Anderson et al. | 526/348.6 |
| 4,113,802 A | 9/1978 | Matteoli et al. | 260/878 |
| 4,200,556 A | 4/1980 | Robinson et al. | 260/3 |
| 4,352,892 A | 10/1982 | Lohmar | 521/79 |
| 4,532,189 A | 7/1985 | Mueller | 428/516 |
| 4,579,905 A | 4/1986 | Krabbenhoft | 525/63 |
| 4,584,347 A | 4/1986 | Harpell et al. | 525/119 |
| 4,694,025 A | 9/1987 | Park | 521/88 |
| 4,714,716 A | 12/1987 | Park | 521/80 |
| 4,820,471 A | 4/1989 | van der Molen | 264/564 |
| 4,916,198 A | 4/1990 | Scheve et al. | 526/351 |
| 5,008,204 A | 4/1991 | Stehling | 436/85 |
| 5,037,895 A | 8/1991 | Marker et al. | 525/351 |
| 5,116,881 A | 5/1992 | Park et al. | 521/143 |
| 5,180,751 A | 1/1993 | Park et al. | 521/51 |
| 5,266,643 A | 11/1993 | Mustonen et al. | 525/263 |
| 5,272,236 A | 12/1993 | Lai et al. | 526/348.5 |
| 5,278,272 A | 1/1994 | Lai et al. | 526/348.5 |
| 5,284,613 A | 2/1994 | Ali et al. | 264/566 |
| 5,348,795 A | 9/1994 | Park | 428/220 |
| 5,358,792 A | 10/1994 | Mehta et al. | 428/516 |
| 5,414,027 A | 5/1995 | DeNicola, Jr. et al. | 522/112 |
| 5,491,019 A | 2/1996 | Kuo | 428/213 |
| 5,527,573 A | 6/1996 | Park et al. | 428/314.8 |
| 5,567,742 A | 10/1996 | Park | 521/143 |
| 5,605,936 A | 2/1997 | DeNicola, Jr. et al. | 521/50.5 |
| 5,616,627 A | 4/1997 | Sakurai et al. | 521/134 |
| 5,641,848 A | 6/1997 | Giacobbe et al. | 526/348.1 |
| 5,747,594 A | 5/1998 | deGroot et al. | 525/240 |
| 5,767,033 A | 6/1998 | Imuta et al. | 502/114 |
| 5,844,045 A | 12/1998 | Kolthammer et al. | 525/240 |
| 5,869,575 A | 2/1999 | Kolthammer et al. | 525/240 |
| 5,883,151 A | 3/1999 | Raetzsch et al. | 522/157 |
| 5,929,129 A | 7/1999 | Feichtinger | 521/134 |
| 6,054,540 A | 4/2000 | Chaudhary et al. | 525/351 |
| 6,103,833 A | 8/2000 | Hogt et al. | 525/386 |
| 6,143,829 A | 11/2000 | Babb et al. | 525/194 |
| 6,143,854 A | 11/2000 | Bamberger et al. | 526/348.1 |
| 6,207,754 B1 | 3/2001 | Yu | 525/133 |
| 6,211,302 B1 | 4/2001 | Ho et al. | 525/333.5 |
| 6,417,242 B1 | 7/2002 | Hughes et al. | 521/142 |

FOREIGN PATENT DOCUMENTS

| | | | |
|---|---|---|---|
| EP | 0 474 376 | 3/1992 | C08L/23/10 |
| EP | 0 595 252 | 5/1994 | C08L/23/04 |
| EP | 0 625 545 | 11/1994 | |
| EP | 0 634 441 | 1/1995 | |
| EP | 0 634 454 | 1/1995 | |
| EP | 0 702 032 | 3/1996 | C08F/8/00 |
| EP | 0 872 517 | 10/1998 | |
| GB | 1 080 619 | 8/1967 | C08F/47/10 |
| GB | 2 205 103 A | 11/1988 | C08F/297/04 |
| JP | 46-31756 | 9/1971 | |
| JP | 50-133248 | 10/1975 | |
| WO | 93/04486 | 3/1993 | H01B/3/44 |
| WO | 96/07681 | 3/1996 | C08F/212/00 |
| WO | 96/20247 | 7/1996 | C08L/23/10 |
| WO | 97/20888 | 6/1997 | |
| WO | 97/20889 | 6/1997 | |
| WO | 99/10415 | 3/1999 | |
| WO | 99/10424 | 3/1999 | |
| WO | 99/10426 | 3/1999 | C08K/5/43 |
| WO | 00/02960 | 1/2000 | |
| WO | 00/02961 | 1/2000 | |
| WO | 00/52091 | 9/2000 | C08K/5/43 |
| WO | 00/53669 | 9/2000 | |
| WO | 00/78858 | 12/2000 | C08L/23/00 |
| WO | 00/78861 | 12/2000 | C08L/23/10 |

OTHER PUBLICATIONS

R. A. Abramovitch et al., "Reaction of Aromatic Sulfonyl Azides with Dienes", *J. Org. Chem.*, vol. 46, pp. 330–335, 1981.

H. Radusch et al., "Chemical coupling of polystyrene and polybutadiene in melt mixtures by using an organic sulfonylazide", *Die Angewandte Makromolekulare Chemie*, vol. 204, pp. 177–189, 1993.

N. Takashima et al., "The Processings of Crosslinked Plastics", *Kogaku Kogyo (Chemical Industry)*, pp. 387–383, 1969.

D. S. Breslow et al., "Thermal Reactions of Sulfonyl Azides", *J. Amer. Chem. Soc.*, vol. 91, pp. 2273–2279, 1969.

Derwent Chemical Abstract No. 77–02552Y of JP 51134762 A.

M. Xanthos, "Interfacial Agents of rMultiphase Polymer Systems: Recent Advances", *Polymer Engineering and Science*, vol. 28, pp. 1392–1400, 1988.

K. A. Chaffin et al., "Semicrystalline Blends of Polyethylene and Isotactic Polypropylene: Improving Mechanical Performance by Enhancing the Interfacial Structure", *Journal of Polymer Science: Part B: Polymer Physics*, vol. 38, pp. 108–121, 2000.

E. P. Moore, *Polypropylene Handbook*, pp. 330–332, 1996.

Han and Shetty, "Studies on Multilayer Film Coextrusion III. The Rheology of Blown Film Coextrusion", *Polymer Engineering and Science*, vol. 18, No. 3, pp. 187–199, 1978.

Inoue, "Selective Crosslinking in Polymer Blends. I. Novel Selective Crosslink Systems for Polypropylene/Unsaturated Elastomer Blends", Journal of Applied Polymer Science, vol. 54, pp. 709–721, 1994.

Inoue, "Selective Crosslinking in Polymer Blends. II. Its Effect on Implact Strength and Other Mechanical Properties of Polypropylene/Unsaturated Elastomer Blends", Journal of Applied Polymer Science, vol. 54, pp. 723–733, 1994.

Inoue and Suzuki, "Selective Crosslinking Reaction in Polymer Blends. III. The Effects of the Crosslinking of Dispersed EPDM Particles on the Impact Behavior of PP/EPDM Blends", Journal of Applied Polymer Science, vol. 56, pp. 1113–1125, 1995.

COMPOSITION AND FILMS THEREOF

This application claims the benefit of U.S. Provisional Application Nos. 60/177,781, filed Jan. 24, 2000, No. 60/211,048, filed Jun. 12, 2000, No. 60/232,977, filed Sep. 14, 2000, and No. 60/257,513, filed Dec. 22, 2000. This invention relates to polyolefins, more particularly to polyolefins for use in coextruded film applications.

BACKGROUND

Currently, blown films are made predominantly from ethylene polymers. There are references to blowing films of propylene polymers, but none are observed to be commercially successful. The low melt strength of propylene polymers inhibits production of blown film with such polymers at commercially feasible rates on standard equipment.

Scheve et al. in U.S. Pat. No. 5,519,785 disclosed the use of polypropylenes having a branching index less than one and having a strain hardening elongational viscosity to blow certain films. The polymers were treated with radiation under specified conditions in a multistep process which involves specialized equipment in steps after polymerization. Such a process is multi step, difficult and preferably avoided.

Giacobbe and Pufka in U.S. Pat. No. 5,641,848 disclose making blown films from a propylene polymer material of broad molecular weight distribution (MWD of about 4-60), a melt flow rate of about 0.5 to 50 dg/min. and xylene insolubles (at 25° C.) of greater than or equal to 94 percent, said propylene polymer material selected from a broad molecular weight distribution propylene homopolymer and an ethylene propylene rubber impact modified broad molecular weight homopolymer. But this blend forms blown films at rates lower than those used commercially for polyethylene blown films.

In some instances, blowing films of polypropylene has been achieved by coextruding a polypropylene with another polymer. For instance, Nicola disclosed in DE 19650673 the use of a rubber modified polypropylene layer between polypropylene layers. Similarly, Landoni in EP 595252 disclosed the use of linear low density polyethylene (LLDPE) or linear medium density polyethylene, optionally with added hydrogenated hydrocarbon resins or other resins or low molecular weight polyethylene or polypropylene waxes between external layers of polypropylene. In EP 474376, Schirmer et al. disclose the use of an ethylene vinyl acetate copolymer (EVA), very low density polyethylene (VLDPE) or ethylene alpha olefin copolymer with a broad molecular weight distribution with a polypropylene layer and a sealable layer.

It would therefore be desirable to have a propylene polymer composition with sufficient melt strength to maintain a stable bubble for blown film manufacture on commercially available equipment, preferably that equipment available for the blowing of ethylene polymer compositions, more preferably both air and water quenched blown film equipment in both high and low stalk configurations, that is equipment commonly used for high density and low density polyethylenes (LDPE), respectively. The term "stalk" is used to designate the neck height of a bubble of polymer being blown into film. To achieve this end, a propylene polymer composition would advantageously have a melt strength that is higher than about 10, preferably between 10–100 cN, more preferably between 20–80 cN, and most preferably between 25–75 cN (measured at 190° C.). Further, it is desirable that the resulting film shows at least a mechanical properties balance.

Rheology modification of the propylene polymers through reaction with coupling agents has now been found to improve the melt strength of the propylene polymers sufficiently to permit production of blown films (both coextruded and monolayer films) with the rheology modified propylene polymers at commercially acceptable rates.

As used herein, the term "rheology modification" means change in the resistance of the molten polymer to flow. The resistance of polymer melts to flow is indicated by (1) the tensile stress growth coefficient and (2) the dynamic shear viscosity coefficient. The tensile stress growth coefficient $\eta_{E+}$ is measured during start-up of uniaxial extensional flow by means within the skill in the art such as is described by J. Meissner in Proc. XIIth International Congress on Rheology, Quebec, Canada, August 1996, pages 7–10 and by J. Meissner and J. Hostettler, Rheol. Acta, 33, 1–21 (1994). The dynamic shear viscosity coefficient is measured with small-amplitude sinusoidal shear flow experiments by means within the skill in the art such as described by R. Hingmann and B. L. Marczinke, J. Rheol. 38(3), 573–87, 1994.

SUMMARY OF THE INVENTION

In one embodiment, the invention is a coextruded film comprising (a) at least one layer comprising at least one coupled propylene polymer coupled by reaction with a coupling agent; and (b) at least one layer comprising an in-reactor blend of a substantially linear polyethylene (or a homogeneously branched linear polyethylene) and a linear low density polyethylene. Component (a) may also contain LDPE, LLDPE, HDPE, substantially linear polyethylene, homogeneously branched linear polyethylene, and blends thereof. Preferably, component (a) contains LLDPE and/or substantially linear polyethylene (or homogeneously branched linear polyethylene) in order to improve the compatibility between component (a) and component (b). In some embodiments, it is more preferable that component (a) contain an in-reactor blend of a substantially linear polyethylene (or a homogeneously branched linear polyethylene) and a linear low density polyethylene.

Particular embodiments are those articles including an institutional liner, consumer liner, heavy duty shipping sack, produce bag, batch inclusion bag, pouch, grocery bag, merchandise bag, packaging, cereal liner, soft paper overwrap, multi-wall bag, lamination or combination thereof, including multiwall or multilayer configurations thereof.

All embodiments of the invention provide improved film processing characteristics (compared to films made without a coupled propylene polymer), and provide films exhibiting excellent mechanical properties, such as Elmendorf tear, 2% secant modulus, puncture resistance and Dart impact.

BRIEF DESCRIPTION OF THE FIGURES

FIG. 1 also shows normalized Trouser tear for monolayer film structures made from 100% MICP and three-layer film structures made from 100% Polyethylene Blend A and having a 25/50/25 weight percentage distribution among the layers.

FIG. 2 also shows normalized Trouser tear for a monolayer film structures made from 100% MICP and three-layer film structures made from 100% Polyethylene Blend A and having a 25/50/25 weight percentage distribution among the layers. Additionally, FIG. 2 shows how Trouser tear changes with varying loading rate.

DETAILED DESCRIPTION OF THE INVENTION

Figure 1:
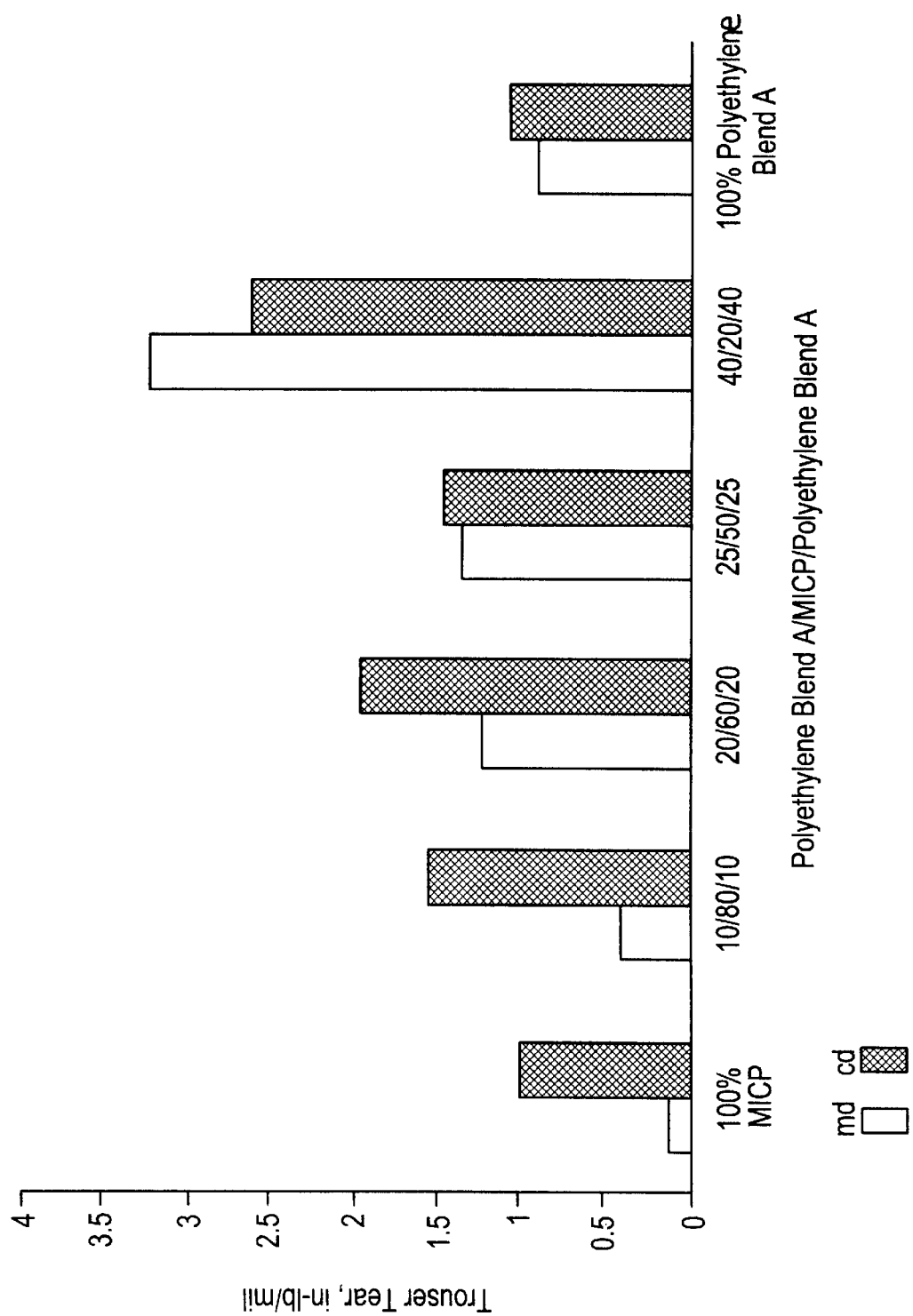
FIG. 1 shows the normalized Trouser tear (in both the machine direction (md) and cross direction (cd)) for several different coextruded A/B/A type film structures. The weight percentage for each layer of each A/B/A structure is indicated along the x-axis and the normalized Trouser tear is measured along the y-axis. Each A layer is made of 100% Polyethylene Blend A and the B layer is made from 100% MICP. Trouser tear is determined in accordance with the procedures of ASTM D-1938-94. All the tests delineated in FIG. 1 are conducted using a 50.8 cm/min loading rate.

As used herein, "coupling" refers to modifying the rheology of a polymer by reacting the polymer with a suitable coupling agent. A "coupled polymer" is a rheology modified polymer resulting from a coupling reaction. A coupled polymer is characterized by an increase in melt strength of at least 25% and a decrease in melt flow rate (MFR), compared to the polymer before coupling. A coupled polymer differs from a heavily crosslinked polymer in that the coupled polymer is thermoplastic and has a low gel level. In contrast, heavy crosslinking (otherwise known as "vulcanization") results in a thermoset polymer characterized by high gel levels.

Crosslinking is evidenced by gel formation which is measured in the case of polypropylene by xylene insolubility, or in the case of films by optically evident gels in a film, for instance as analyzed by a laser gel counter commercially available from Optical Control System, Inc. under the trade designation FS-3

The term "a coupling amount" of poly(sulfonyl azide) is used herein to designate that amount of poly(sulfonyl azide) effective to result in a measurable increase in melt strength of the polymer it reacts with such that the desired or predetermined amount of modification is realized.

"Melt Strength" is measured by using a capillary rheometer fitted with a 2.1 mm diameter, 20:1 die with an entrance angle of approximately 45 degrees. After equilibrating the samples at 190° C. for 10 minutes, the piston is run at a speed of 1 inch/minute (2.54 cm/minute). The standard test temperature is 190° C. The sample is drawn uniaxially to a set of accelerating nips located 100 mm below the die with an acceleration of 2.4 mm/sec². The required tensile force is recorded as a function of the take-up speed of the nip rolls. The maximum tensile force attained during the test is defined as the melt strength. In the case of polymer melt exhibiting draw resonance, the tensile force before the onset of draw resonance was taken as melt strength. The melt strength is recorded in centiNewtons.

The term "mechanical properties balance" is used to mean good toughness as measured by Elmendorf tear strength greater than about 50 g/mil in machine direction (MD) and about 100 g/mil in cross direction (CD); together with 2% secant modulus, in either the cross direction or machine direction, equal to or greater than 30,000 psi; and with dart impact equal to or greater than 100 g/mil.

A "propylene polymer" (also called polypropylene) is any polymer comprising greater than fifty (50) weight percent, preferably, greater than sixty five (65) weight percent —CHCH$_3$CH$_2$— repeating units as derived from a propylene monomer. Propylene polymers include propylene homopolymer as well as random and impact copolymers of propylene. Such polymers include terpolymers, tetrapolymers and higher order polymers of ethylene, propylene and other olefins optionally dienes.

An "ethylene polymer" (also called polyethylene) is any polymer comprising greater than fifty weight percent —CH$_2$CH$_2$— repeating units as derived from an ethylene monomer. Ethylene polymers include homopolymers of ethylene as well as random and block copolymers of ethylene. Such polymers include terpolymers, tetrapolymers and higher order polymers of ethylene, propylene and other olefins optionally dienes.

A "substantially linear polyethylene" is that polyethylene as described in U.S. Pat. Nos. 5,373,236 and 5,278,272 which are incorporated by reference herein in their entireties.

"Homogeneously branched linear polyethylenes" are polyethylenes having a CDBI greater than 50% as calculated in accordance with WO 93/04486 using the equipment and procedures as described in U.S. Pat. No. 5,008,204, such as polyethylenes available from the Exxon Chemical Company under the trade names EXCEED and EXACT.

Propylene Polymers

This invention involves coextruded films containing at least one layer containing a coupled propylene polymer which is coupled using a poly(sulfonyl azide).

In either propylene copolymers or ethylene copolymers, the propylene or ethylene, respectively, is suitably copolymerized with one or more monomers copolymerizable therewith, but preferably with at least one other olefin or alpha olefin. Olefins include ethylene and alpha olefins, which include propylene, 1-butene, 1-pentene, 1-hexene, 1-octene, 1-nonene, 1-decene, 1-unidecene, 1-dodecene and the like as well as 4-methyl-1-pentene, 4-methyl-1-hexane, 5-methyl-1-hexane, vinylcyclohexane, styrene and the like. Preferred olefins and alpha olefins for copolymerization with propylene include ethylene, butylene, and other higher alpha olefins, that is alpha olefins having at least 3 carbon atoms, more preferably ethylene or butylene, and higher alpha olefins, most preferably ethylene. Preferred alpha olefins for copolymerization with ethylene include propylene, butene, pentene, hexene, heptene, and octene, more preferably hexene or octene, most preferably octene.

The propylene polymer starting materials are suitably of any molecular weight distribution (MWD). MWD is calculated as the ratio $M_w/M_n$, where $M_w$ is the weight average molecular weight and $M_n$ is the number average molecular weight. Those skilled in the art are aware that polymers having a MWD less than about 3 are conveniently made using a metallocene or constrained geometry catalyst or using electron donor compounds with Ziegler Natta catalysts. In the practice of the invention, the MWD of the propylene polymer is preferably at least about 2 and more preferably up to about 8, most preferably up to about 5.

Polyolefins are formed by means within the skill in the art. The alpha olefin monomers and optionally other addition polymerizable monomers are polymerized under conditions within the skill in the art, for instance as disclosed by Galli, et al., *Angew. Macromol. Chem.*, Vol. 120, p. 73 (1984), or by E. P. Moore, Propylene Handbook, Hanser, New York, 1996 pages 15–45, 74-111, U.S. Pat. Nos. 3,645,992; 3,687, 920; 3,893,989; 3,914,342; 4,003,712; 4,076,698; 4,113, 802; 5,272,236; 5,278272; 5,747,594; 5,844,045 and 5,869, 575. These U.S. patents are incorporated herein by reference.

The comonomers or combination of comonomers is used in any relative quantities within the definitions of the polymers. For propylene polymers, the comonomer content is preferably less than about 35, more preferably 2–30, most preferably 5–20 weight percent.

The propylene polymers are preferably stereoregular (i.e. syndiotactic or isotactic), more preferably isotactic, most preferably having an isotacticity as measured by $C^{13}$ NMR of at least about 50 percent.

The propylene polymer melt flow rate is measured by ASTM D1238 at 230° C./2.16 kg. The melt flow rate of the coupled propylene polymer is preferably at least about 0.1 g/10 min, more preferably at least about 0.2 g/10 min. It is preferably up to about 20 g/10 min, more preferably up to about 10 g/10 min, further more preferably up to about 4 g/10 min, most preferably up to about 2 g/10 min to achieve good processability and mechanical properties balance. One recognizes good processability by high output rates (>6 pounds per hour per inch of die circumference (0.298 g/s/cm)).

The propylene polymer is advantageously a homopolymer for purposes of ready availability of starting material and resulting competitive pricing. Random and impact copolymers are preferred for compatibility of propylene and ethylene polymers. Higher compatibility results in improved film physical and mechanical properties such as tear and dart as compared with the base polypropylene resin of the copolymers, impact copolymers are more preferred, again, because they are very compatible with ethylene copolymers. Random copolymers are preferred when film optical properties (that is clarity and haze) are important.

Impact propylene copolymers are commercially available and are well within the skill in the art, for instance, as described by E. P. Moore, Jr in *Polypropylene Handbook*, Hanser Publishers, 1996, page 220 and U.S. Pat. Nos. 3,893,989 and 4,113,802. The term "impact copolymer" is used herein to refer to heterophasic propylene copolymers where polypropylene is the continuous phase and an elastomeric phase is uniformly dispersed therein. The impact copolymers result from an in-reactor process rather than physical blending. Usually the impact copolymers are formed in a dual or multi-stage process, which optionally involves a single reactor with at least two process stages taking place therein, or optionally multiple reactors. Advantageously, the impact copolymers have at least about 5 weight percent, preferably at least about 10, preferably up to about 40, more preferably up to about 35 weight percent, further more preferably up to about 25 weight percent, and most preferably up to about 20 weight percent ethylene. Illustrative impact copolymer propylene polymers include those available from The Dow Chemical Company under the trade designations INSPiRE C104-01, INSPiRE C105-02, DC-111, and INSPiRE C107-04, propylene impact copolymers having melt flow rates of 1, 2, 0.8, and 4 g/10 min, respectively, under a weight of 2.16 kg at a temperature of 230° C. and flexural (flex) modulus as measured according to the procedures of ASTM D 790A of 180,000, 140,000, 166,800, and 170,000 psi (1,241,056; 965,266; 1,150,000, and 1,172,109 kPa, respectively).

Coupling Agents

In the practice of the invention, at least one propylene polymer resin is reacted with a chain coupling agent which is a poly(sulfonyl)azide. When the poly(sulfonyl)azide reacts with the propylene polymer resin, at least two separate propylene polymer chains are advantageously joined and the molecular weight of the polymer chain is increased. In the preferred case when the poly(sulfonyl azide) is a bis (sulfonyl azide) (hereinafter "BSA"), two propylene polymer chains are advantageously joined.

The poly(sulfonyl azide) is any compound having at least two sulfonyl azide groups ($-SO_2N_3$) reactive with the propylene polymer. Preferably the poly(sulfonyl azide)s have a structure X-R-X wherein each X is $SO_2N_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the propylene polymer and the sulfonyl azide, more preferably at least 1, more preferably at least 2, most preferably at least 3 carbon, oxygen or silicon, preferably carbon, atoms between functional groups. While there is no critical limit to the length of R, each R advantageously has at least one carbon or silicon atom between X's and preferably has less than about 50, more preferably less than about 20, most preferably less than about 15 carbon, oxygen or silicon atoms. Silicon containing groups include silanes and siloxanes, preferably siloxanes. The term inertly substituted refers to substitution with atoms or groups which do not undesirably interfere, at the coupling reaction conditions, with the desired reaction(s) or desired properties of the resulting coupled polymers. Such groups include fluorine, aliphatic or aromatic ether, siloxane as well as sulfonyl azide groups when more than two propylene polymer chains are to be joined. R is suitably aryl, alkyl, aryl alkaryl, arylalkyl silane, siloxane or heterocyclic, groups and other groups which are inert and separate the sulfonyl azide groups as described. More preferably R includes at least one aryl group between the sulfonyl groups, most preferably at least two aryl groups (such as when R is 4,4' diphenylether or 4,4'-biphenyl). When R is one aryl group, it is preferred that the group have more than one ring, as in the case of naphthylene bis(sulfonyl azides). Poly(sulfonyl) azides include such compounds as 1,5-pentane bis (sulfonylazide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl) hexane, 2,7-naphthalene bis(sulfonyl azide), and mixed sulfonyl azides of chlorinated aliphatic hydrocarbons containing an average of from 1 to 8 chlorine atoms and from about 2 to 5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis(sulfonyl azido)biphenyl, 4,4'-diphenyl ether bis (sulfonyl azide) and bis(4-sulfonyl azidophenyl)methane, and mixtures thereof.

Sulfonyl azides are commercially available or are conveniently prepared by the reaction of sodium azide with the corresponding sulfonyl chloride, although oxidation of sulfonyl hydazines with various reagents (nitrous acid, dinitrogen tetroxide, nitrosonium tetrafluoroborate) has been used.

The subject matter of this invention is not dependent on the reaction mechanisms. The following discussion regarding the coupling reaction mechanism provides the inventors current theories but is not intended to limit the scope of this invention. Sulfonyl azides decompose in several ways, but for the practice of the invention, the reactive species, believed to be the singlet nitrene, as evidenced by insertion into C—H bonds is desired. Thermal decomposition is reported to give an intermediate singlet sulfonyl nitrene, which will react readily by insertion into carbon-hydrogen bonds. The high temperatures necessary for efficient formation of the sulfonyl nitrene is usually greater than about 150° C. Sulfonyl azides also form another intermediate believed to be a triplet nitrene under appropriate conditions, such as temperatures in excess of about 250° C. This intermediate leads to chain scission and, therefore, is preferably avoided in the practice of this invention.

The poly(sulfonyl azide) is preferably at least partially mixed with the propylene polymer before the resulting mixture is heated to the peak decomposition temperature of the poly(sulfonyl azide). By peak decomposition temperature of the poly(sulfonyl azide) is meant that temperature at which the azide converts to the sulfonyl nitrene, eliminating nitrogen and more heat in the process. Specifically the peak decomposition temperature, as determined by differential scanning calorimetry (DSC). For instance, a differential scanning calorimeter (DSC) thermogram of the bis (sulfonyl azide) of diphenyl oxide shows a no change in the heat flow until a sharp endothermic melting peak is observed at 100° C. The baseline is flat again (no heat flow) until a broad exothermic peak is observed that begins about 150° C., peaks at 185° C. (referred to herein as the peak decomposition temperature) and is complete by 210° C. The total amount of energy released due to decomposition of the sulfonyl azide groups is about 1500 Joules/gram. The peak decomposition temperature is advantageously greater than about 150° C., preferably greater than about 160° C., more preferably greater than about 180° C.

Those skilled in the art recognize that the poly(sulfonyl) azide, the reactivity of the azide, and the desired or predetermined amount of chain coupling determine the amount of poly(sulfonyl)azide to be used. In the compositions of the invention, the amount of coupling desirable is optionally determined from the desired melt strength in the coupled propylene polymer. The melt strength of the coupled propylene polymer is advantageously sufficient for the co-extruded film to form and maintain a sufficiently stable bubble on film blowing equipment to run at commercial output rates. Preferably, the melt strength of the coupled propylene polymer is at least about 5, more preferably at least about 10 cN, further more preferably at least about 20 cN, still further more preferably at least about 25 cN, most preferably at least about 40 cN, and in some instances at least about 50 cN, more preferably in these instances at least about 60 cN. To avoid blown film bubble instabilities, the melt strength is preferably up to about 100, more preferably up to about 75 cN. Determining the amount of poly(sulfonyl azide) that gives this result is within the skill in the art. The amount is preferably at least about 50 parts per million by weight of the propylene polymer (ppm), more preferably at least about 100 ppm, most preferably at least about 150 ppm and, in some instances, preferably at least about 200 ppm. In the practice of the invention, formation of crosslinked networks to an extent that would result in intractable propylene polymer is to be avoided; therefore, poly(sulfonyl azide) is preferably limited to that amount which results in chain coupled or rheology modified (but not substantially crosslinked) propylene polymer, preferably less than about 1000 ppm, more preferably less than about 600 ppm, most preferably less than about 500 ppm poly(sulfonyl azide) based on the total weight of propylene polymer, preferably polypropylene or polypropylene/ethylene copolymer blend. Substantial crosslinking is characterized by the presence of gels of sufficient size or weight precentage such that the processing of the film is detrimentally affected. Such detrimental effects include output reduction; discontinuity of the film; increased backpressure; and/or, partial die plugging.

Preparation of Modified Polypropylene

The propylene polymer(s) and coupling agent are suitably combined in any manner which results in desired reaction thereof, preferably by mixing the coupling agent with the polymer under conditions which allow sufficient mixing before or during reaction to avoid unnecessary or undesirably uneven amounts of localized reaction. An undesirable amount is an amount which interferes with the purpose of the final product. Any mixing equipment is suitably used with the invention, preferably equipment which provides sufficient mixing and temperature control in the same equipment, but advantageously practice of this embodiment takes place in such devices as an extruder, melt mixer, pump conveyor or a polymer mixing devise such as a Brabender melt mixer. While it is within the scope of this embodiment that the reaction take place in a solvent or other medium, it is preferred that the reaction be in a bulk phase to avoid later steps for removal of the solvent or other medium. In a preferred embodiment the process of the present invention takes place in a single vessel, that is mixing of the coupling agent and polymer takes place in the same vessel as heating to the decomposition temperature of the coupling agent. The vessel is most preferably a twin-screw extruder, but preferably a single-screw extruder or advantageously a melt mixer, including a batch mixer. The reaction vessel more preferably has at least two zones of different temperatures into which a reaction mixture would pass.

In the most preferred embodiment, the propylene polymer and the coupling agent are physically mixed at a temperature which is low enough to minimize the reaction between the coupling agent and the polymer. Such physical mixing can occur in any equipment, such as V-blenders, ribbon or paddle blenders, tumbling drums, or extruders, which will mix the coupling agent and the propylene polymer. The term extruder is used for its broadest meaning to include such devices as a device which extrudes pellets as well as an extruder which produces the extrudate for forming into articles, such as a film.

Preferably, this physical mixing occurs in the early stages of an extruder, most preferably a twin screw extruder. In particular, this embodiment may be practiced by simultaneously introducing the propylene polymer resin and the coupling agent into the feed section of an extruder. The extruder is configured to have a first section that physically mixes and conveys the coupling agent and polymer in a manner that minimizes the reaction between the coupling agent and the polymer. The melt stream temperature(s) in the first section are preferably less than about 180 C., more preferably less than about 170 C., most preferably less than about 140 C, and in some instances less than about 130 C, preferably less than about 120 C. The conveying first section is followed by at least a second section where the coupling agent and polymer are rapidly further mixed and sufficient heat is added to cause significant reaction between the coupling agent and polymer. Preferably, the melt stream temperature(s) in the second section are from about 160 C. to about 250 C., more preferably from about 200 C. to about 250 C., in order to obtain sufficient reaction between the coupling agent (poly(sulfonyl azide)) and the propylene polymer. Where degradation of the propylene polymer is of a particular concern, the melt stream temperature is preferably from about 200 C. to about 230 C.

In the description of this invention, when temperatures are described in terms of the stream temperatures, that is, temperatures inside the polymer stream or polymer melt rather than the temperatures of the equipment, which are understood by those skilled in the art to be likely to be lower or higher than stream temperatures because of imperfect heat transfer into the polymer or induced shear heating of the polymer. Those skilled in the art can determine the relationship between stream temperature and equipment or gage temperature of particular equipment without undue experimentation. It is known in the art that the polymer melt (stream) temperature is advantageously close to the machine set temperature in the initial zones of an extruder, but the polymer melt (stream) temperature can often be greater than the machine set temperatures in the latter zones of the extruder as it approaches the exit die of the extruder due to mechanically induced shear heating.

In another embodiment, the mixing is preferably attained with the polymer in a molten or at least partially melted state, that is, above the softening temperature of the polymer, or in a dissolved or finely dispersed condition rather than in a solid mass or particulate form. Melt phase mixing is advantageous for forming a substantially uniform admixture of coupling agent and polymer before exposure to conditions in which a significant amount of chain coupling takes place. Conveniently for this embodiment, the formation of a substantially uniform admixture occurs along a temperature profile within equipment such as an extruder. The first zone is advantageously at a temperature at least the softening temperature of the polymer(s) and preferably less than the decomposition temperature of the coupling agents and the second zone being at a temperature sufficient for decomposition of the coupling agent. Especially in the case of propylene polymers, most preferably the propylene polymer (s) and coupling agent are exposed to a profile of melt stream temperatures ranging from about 160° C. to about 250° C.

Those skilled in the art recognize that a polymer, or mixture thereof, typically melts over a range of temperatures rather than melting sharply at one temperature. For the practice of this embodiment, it is sufficient that the polymer be in a partially melted state. For convenience, the temperature of this degree of melting can be approximated from the differential scanning calorimeter (DSC) curve of the polymer or mixture thereof to be treated.

Conveniently, when there is a melt extrusion step between production of the polymer and its use, at least one step of the process of the invention takes place in the melt extrusion step. The heat produced during the extrusion step provides the energy necessary to cause the reaction between the coupling agent and the target polymer.

For all embodiments, a temperature of at least the decomposition temperature of the coupling agent is preferably maintained for a time sufficient to result in decomposition of at least sufficient coupling agent to avoid later undesirable reaction, preferably at least about 80, more preferably at least about 90, most preferably at least about 95 weight percent of the coupling agent is reacted. Those skilled in the art realize that this time is dependent on whether the temperature is one at which the coupling agent slowly decomposes or one at which it very rapidly decomposes. Preferably, the time will be at least about 5 seconds, more preferably at least about 10 seconds to avoid unreacted coupling agent, and subsequent undesirable reactions, or to avoid the need for inconveniently, possible destructively high temperatures. Conveniently, the reaction time is about 20 seconds.

As discussed previously, the melt strength of the propylene polymer is advantageously increased by this coupling reaction. Preferably, the melt strength is increased to at least about 1.5, more preferably 2.0, times the melt strength of the polypropylene before coupling, most preferably at least about 3 times that of the polymer before coupling and in some instances at least 11 times that of the polymer before coupling. The melt strength is preferably at least sufficient to support a stable bubble at output rates of at least about 6 lb/hr/in of die circumference (0.298 g/s/cm) at 2 mil (50 micron) gauge, more preferably at least about 8 lb/hr/in of die circumference (0.397 g/s/cm) at 2 mil gauge, most preferably at least about 11 lb/hr/in of die circumference (0.546 g/s/cm) at 2 mil gauge, and, in some instances, at least about 14 lb/hr/in of die circumference (0.695 g/s/cm) at 2 mil gauge. Preferably, the melt strength of modified propylene polymer is up to 20 times that of the polymer before coupling, more preferably 12 or less. When excessive levels of coupling agents are used, one can experience gels, poor drawability (insufficient to draw the film to gauges as low as 0.6 mils (15 microns)), tear-off at the die, and lower than desired mechanical properties, such as dart and tear strength.

Melt strength is measured in uniaxial conditions extensional flow at isothermal conditions. Linear chains of isotactic polypropylene do not strain harden for all molecular weights reported in literature. In contrast, homopolymer and random copolymer chain-coupled isotactic polypropylene chains strain harden strongly as indicated by a rise in the viscosity $\eta_{E+}$ by a factor of 10–100 when characterized under the same conditions. Surprisingly, the impact copolymer polypropylene resins used by us do not strain harden on coupling when characterized under the same condition.

Ethylene Polymers

Examples of in-reactor polyethylene blends of substantially linear polyethylene and LLDPE are disclosed in U.S. Pat. No. 5,844,045 to Kolthammer et al. and U.S. Pat. No. 5,869,575 to Kolthammer et al., both of which are incorporated herein by reference for their teaching regarding in-reactor blends.

Preferably, the LLDPE fraction of the in-reactor polyethylene blend is at least about fifty weight percent (50 wt %) of the in-reactor blend, more preferably at least about fifty five weight percent (55 wt %), most preferably at least about sixty weight percent (60 wt %). Preferably the LLDPE fraction of the in-reactor blend does not exceed about eighty five weight percent (85 wt %) of the in-reactor blend, more preferably does not exceed about eighty weight percent (80 wt %), most preferably does not exceed about seventy five weight percent (75 wt %).

The polymer starting materials are suitably of any molecular weight distribution (MWD). MWD is calculated as the ratio $M_w/M_n$, where $M_w$ is the weight average molecular weight and $M_n$ is the number average molecular weight. Those skilled in the art are aware that polymers having a MWD less than about 3 are conveniently made using a metallocene or constrained geometry catalyst (especially in the case of ethylene polymers) or using electron donor compounds with Ziegler Natta catalysts. In the practice of the invention, the MWD of the LLDPE fraction of the in-reactor blend is preferably at least about 2 and preferably up to about 8, more preferably up to about 6, most preferably up to about 4. The MWD of the substantially linear polyethylene or homogeneously branched linear polyethylene fraction of the in-reactor polyethylene blend is preferably at least about 1 and preferably up to about 6, more preferably up to about 4, most preferably up to about 3.

The in-reactor polyethylene blend of the invention preferably has a melt index (MI) as measured by ASTM D-1238 condition 190° C./2.16 Kg (formerly known as Condition E) of at least about 0.1 g/10 min., more preferably at least about 0.3 g/10 min, most preferably at least about 0.5 g/10 min, and in some instances, at least about 1.0 g/10 min. The MI of the in-reactor blend is preferably less than 15 g/10 min, more preferably less than about 10 g/10 min, further more preferably less than about 6 g/10 min, most preferably less than about 4 g/10 min. The in-reactor polyethylene blends preferably have a density at least about 0.865 g/cm³ as measured by ASTM D 792, more preferably at least about 0.87 g/cm$^3$, further more preferably at least about 0.88 g/cm$^3$, most preferably at least about 0.90 g/cm$^3$. Preferably, the density is less than 0.96 g/cm$^3$, more preferably up to about 0.95 g/cm$^3$, further more preferably up to about 0.930 g/cm$^3$, most preferably up to about 0.925 g/cm$^3$.

The substantially linear polyethylene or homogeneously branched linear polyethylene fraction of the in-reactor blend preferably have a density approximately equal to the density of the coupled propylene polymer, preferably the density of the substantially linear polyethylene or homogeneously branched linear polyethylene fraction is within about ±0.015 g/cc of the density of the coupled propylene polymer used in the first layer, more preferably within about ±0.010 g/cc, most preferably within about ±0.005. For a typical coupled propylene polymer used in the invention, the density of the substantially linear polyethylene or homogeneously branched linear polyethylene fraction is preferably between about 0.885 g/cc and about 0.915 g/cc, more preferably between about 0.890 g/cc and about 0.910 g/cc, most preferably between about 0.895 g/cc and about 0.905 g/cc. Additionally, it is preferable that the substantially linear polyethylene or homogeneously branched linear polyethylene fraction have relatively high molecular weight as indicated by a melt index (MI) preferably less than about 0.8 g/10 min, more preferably less than about 0.5 g/10 min, further more preferably less than about 0.3 g/10 min, most preferably less than about 0.2 g/10 min. It is believed that the high molecular weight substantially linear polyethylene or homogeneously branched linear polyethylene fractions will cause increased entanglement between the polyethylene and propylene polymer chains, which will lead to improved mechanical properties in the resulting coextruded films, including improved Elmendorf tear, puncture and dart impact as compared with a similar coextruded film made from coupled propylene polymer and LLDPE alone.

The density and melt index (MI) of the LLDPE fraction of the in-reactor polyethylene blend of the invention are of the appropriate values such that the desired MI and density of the in-reactor polyethylene blend are obtained. Preferably, the MI of the LLDPE fraction is between about 1.0 g/10 min and 10.0 g/10 min, more preferably between about 1.1 g/10 min and 8.0 g/10 min, most preferably between about 1.2 g/10 min and 4.0 g/10 min.

Melt or dry blending, e.g. at the hopper of the extruder or in an off-line tumble blending operation, is useful to achieve any blends of coupled propylene polymer and polyethylene used in the invention.

Different ethylene polymers may be used for different layers of the coextruded film. Each polymer will contribute a desirable characteristic to the resulting film. Similarly, more than one propylene polymer is optionally included in the coextruded film of the invention. At least one of the propylene polymers is coupled in the practice of the invention; however, coupling of one or more other polymers included in the coextruded film is optional. Furthermore, polymers other than ethylene polymers and propylene polymers are optionally included with the at least one coupled propylene polymer and the in-reactor polyethylene blend in the coextruded film of the invention.

Film Forming

The technique of blown film extrusion is well known for the production of thin plastic films. In an advantageous process, plastics, such as low, linear low, and high density polyethylene (LDPE, LLDPE, and HDPE) are extruded through a circular die to form a film. Air is introduced through the center of the die to maintain the film in the form of a bubble which increases the diameter of the film about 2 to 6 fold, after which the bubble is collapsed onto rollers. There are a number of variations of such a process within the skill in the art, for instance as described in such references as U.S. Pat. Nos. 3,959,425; 4,820,471, where the difference between high (referred to as "long stalk" therein) and low stalk film blowing is discussed at column 1; 5,284,613; W. D. Harris, et al in "Effects of Bubble Cooling on Performance and Properties of HMW-HDPE Film Resins", *Polymers, Laminations & Coatings Conference, Book* 1, 1990, pages 306–317; and, Moore, E. P., *Polypropylene Handbook*, Hanser, New York, 1996, pages 330–332. For instance, cooling is often advantageously modified because the art recognizes that polypropylene cools and crystallizes at a rate different from that of polyethylene. Therefore, adjustments to the cooling parameters often produce a more stable bubble at desired output rates.

In the formation of blown films, a melt enters a ring-shaped die either through the bottom or side thereof. The melt is forced through spiral grooves around the surface of a mandrel inside the die and extruded through the die opening as a thick-walled tube. The tube is expanded into a bubble of desired diameter and correspondingly decreased thickness as previously described.

The formation of coextruded blown films is known in the art and applicable to the present invention. Articles illustrative of the art include Han and Shetty, "Studies on Multilayer Film Coextrusion III. The Rheology of Blown Film Coextrusion," *Polymer Engineering and Science*, February, (1978), vol. 18, No. 3 pages 187–199; and Morris, "Peel Strength Issues in the Blown Film Coextrusion Process," 1996 *Polymers, Laminations & Coatings Conference*, TAPPI Press, Atlanta, Ga. (1996), pages 571–577. The term "coextrusion" refers to the process of extruding two or more materials through a single die with two or more orifices arranged such that the extrudates merge together into a laminar structure, preferably before chilling or quenching. Coextrusion systems for making multilayer films employ at least two extruders feeding a common die assembly. The number of extruders is dependent upon the number of different materials comprising the coextruded film. For each different material, a different extruder is advantageously used. Thus a five-layer coextrusion may require up to five extruders although less may be used if two or more of the layers are made of the same material.

Coextrusion dies are used to form coextruded blown films. They have multiple mandrels that feed the different melt streams to the circular die lip. When feedblocks are employed to stack melt layers from two or more extruders, the resulting multilayered melt stream is then fed to the film die.

Preferably, the coextruded blown films of the invention are produced at rates of at least about 6 lb/hr/in of die circumference (0.298 g/s/cm of die circumference), more preferably at least about 8 lb/hr/in of die circumference (0.496 g/s/cm of die circumference), most preferably at least about 10 lb/hr/in of die circumference (0.695 g/s/cm of die circumference).

Coextruded blown films of the present invention can be formed into pouches, bags, containers and the like using packaging machinery within the skill in the art such as heat sealing devices using mandrels and the like. Pouches, bags and other containers made from this combination of materials provide excellent toughness and impact strength and furthermore provide an excellent barrier to grease and oil and light hydrocarbons such as turpentine and the like. Coextruded blown film of the present invention can be used as a packaging substrate alone, as a liner in multi-wall bags, or a strength/sealant ply in laminated structures such as with polyethylene terephthalate or biaxially oriented polypropylene.

In multilayer films each layer advantageously imparts a desired characteristic such as weatherability, heat seal, adhesion, chemical resistance, barrier layers (e.g. to water or oxygen), elasticity, shrink, durability, hand and feel, noise or noise reduction, texture, embossing, decorative elements, impermeability, stiffness, and the like. Adjacent layers are optionally direct adhered, or alternatively have an adhesive, tie or other layer between them, particularly for the purpose of achieving adhesion there between. Constituents of the layers are selected to achieve the desired purpose.

In the invention, a coupled propylene polymer, as described herein, is used for one layer of the coextruded film. This first layer may optionally contain polyethylene blended with the propylene polymer. This first layer is adjacent to a second layer that is comprised of an in-reactor polyethylene blend of both a substantially linear polyethylene (or a homogeneously branched linear polyethylene) and a LLDPE. Preferably, the first layer comprises about 50 weight percent or less of the overall film structure, more preferably, the first layer comprises about 30 weight percent or less of the overall film structure; and in some instances where high tear strength is desired, the first layer is comprises less than about twenty five weight percent (25 wt %) of the overall film structure, preferably less than about twenty weight percent (20 wt %) of the overall film structure. It is believed that minimizing the weight percent of the first layer will provided improved film material properties, such as Elmendorf tear, puncture, and Dart impact, as compared to comparable films having a first layer that makes-up a higher weight percentage of the overall structure.

Blending ethylene polymer into the first layer containing the coupled propylene polymer will improve the compatibility of the first layer containing the coupled propylene polymer and the second layer containing the in-reactor polyethylene blend for one another in the multilayer film structure. This improved compatibility will improve the mechanical film properties such as Elmendorf tear. The ethylene polymer may comprise LLDPE, LDPE, HDPE, substantially linear polyethylene, homogeneously branched linear polyethylene, and blends thereof. Preferably, any ethylene polymer that is blended with the coupled propylene polymer is a LLDPE, substantially linear polyethylene, homogeneously branched linear polyethylene, an in-reactor polyethylene blend as contained in the second layer, and mixtures thereof. More preferably, an in-reactor polyethylene blend as contained in the second layer described above is added to the first layer.

For applications where tear properties of the coextruded film are critical, the first layer is preferably comprised of less than about fifty percent (50%) by weight coupled propylene polymer, more preferably less than thirty percent (30%) by weight coupled propylene polymer, in some instances less than twenty five percent (25%) by weight coupled propylene polymer. For high tear applications (i.e. Elmendorf tear strength greater than about 200 g/mil) it is preferable for the total weight percent of the coupled propylene polymer in the film to be less than about 25 wt %, more preferably less than about 20 wt %, in order to optimize the tear properties of the film. Preferably, the coupled propylene polymer making up the first layer is an impact propylene copolymer or a random propylene copolymer to further improve the compatibility between the first and second layers. For film applications requiring high tear, the coupled propylene polymer more preferably is an impact propylene copolymer. For film applications requiring excellent optics, the coupled propylene copolymer is more preferably a random copolymer.

For applications where grease resistance is a concern, it is preferable for the first layer to be comprised of at least about eighty percent (80%) by weight coupled propylene polymer, more preferably, the first layer is comprised of about one hundred percent coupled propylene polymer, preferably either an impact propylene copolymer or a random propylene copolymer for compatibility with the polyethylene of the second layer, more preferably an impact propylene copolymer. In addition to improved grease resistance, it is believed that coextruded film structures having a first layer comprised of between about 80% and 100% by weight coupled propylene polymer will be more readily processed than comparable coextruded film structures not having a layer that is comprised of between about 80% and 100% by weight coupled propylene polymer. This will lead to films that can be produced at a higher rates using broader processing window conditions.

In the most preferred embodiment of the invention, the first layer comprising coupled propylene polymer is sandwiched between two ethylene polymer layers. One of these sandwich layers is the second layer as described above, the other layer (or third layer) can be comprised of the same in-reactor polyethylene blend as described for the second layer or it can be comprised of other polymers that are chosen depending on the properties this third layer can add to the overall properties desired of the co-extruded film structure. Having a second and third layer made from the same in-reactor polyethylene blend as described above is preferable for ease and simplicity of manufacturing. Also, it is believed such an A/B/A film structures (where the first layer is denoted by B and the second and third layers are the same and denoted by A) will provide a film exhibiting mechanical properties balance, preferably an excellent mechanical properties balance. Preferably, films of the invention have a machine direction tear resistance (MD tear) as measured according to the procedures of ASTM D1922 of at least about 50 g/mil (2 g/micron), more preferably at least about 75 g/mil (3 g/micron), most preferably at least about 100 g/mil (4 g/micron); and a cross directional tear resistance (CD tear) as measured according to the procedures of ASTM D1922 of at least about 100 g/mil (4 g/micron), more preferably at least about 150 g/mil (6 g/micron) most preferably at least about 200 g/mil (8 g/micron); and together with a 2% secant modulus, measured in either the cross direction or machine direction, of at least about 30,000 psi, more preferably at least about 40,000 psi. Further, sandwiching the first layer (B) between two layers comprised of in-reactor polyethyelene blend will provide a film structure that exhibits excellent clarity (gloss and haze) and heat seal and hot tack performance properties.

Surprisingly, blown films according to the current invention can be produced at higher output rates, higher haul-off rates, thinner film thicknesses, or a combination thereof.

Additives

Additives are optionally included in compositions of the invention. Additives are well within the skill in the art. Such additives include, for instance, stabilizers including free radical inhibitors and ultraviolet wave (UV) stabilizers, neutralizers, nucleating agents, slip agents, antiblock agents, pigments, antistatic agents, clarifiers, waxes, resins, fillers such as silica and carbon black and other additives within the skill in the art used in combination or alone. Effective amounts are known in the art and depend on parameters of the polymers in the composition and conditions to which they are exposed.

Uses

These films are advantageously used to make institutional liners, that is liners (or trash bags) for trash cans used in industry. Characteristics useful in these liners are good tear, (dart) impact strength, puncture strength, and high modulus. The term "good" is used to indicate Elmendorf tear above about 50 g/mil in the MD and 100 g/mil in the CD measured by the tests described herein, Dart impact strength above about 100 g/mil as measured by the modified procedure of ASTM D1709 condition A. The term "high modulus" is used to mean secant modulus as measured by ASTM D 882 of at least about 40,000 psi (275,790 kPa). The liners and similar products are made for instance by processes within the skill in the art such as those disclosed by C. A. van Kerckhoven, et al, "Quality Performance Optimization Tools for the Fabrication of HMW-HDPE Blown Film", *Polymers, Laminations, & Coatings Conference, Book* 2, 1990, pages 68–85.

The present invention includes but is not limited to use of the films of the invention in such applications as consumer liners, heavy duty shipping sacks, produce bags, batch inclusion bags, pouches, grocery bags, merchandise bags, bags for foam packaging (especially where the foam is formed in the bag), cereal liners, soft paper overwrap, multi-wall bags, baler bags, bundling films, compression films and laminations.

Films of the current invention are also useable as heat seal films, pouches or bags.

EXAMPLES

The following examples are to illustrate this invention and do not limit it. Ratios, parts, and percentages are by weight unless otherwise stated.

Testing Methods

For the examples below, unless otherwise indicated: melt flow rate (MFR) is measured in accordance with ASTM D 1238, at a temperature of 230 C. under a weight of 2.16 Kg; melt index (MI) is measured in accordance with ASTM D 1238, at a temperature of 190 C. under a weight of 2.16 Kg; Dart impact is measured in accordance with ASTM D-1709 (method A); Elmendorf tear is measured in accordance with ASTM D-1922 (type B); Trouser tear is measured in accordance with ASTM D-1938-94; and Secant modulus is measured in accordance with ASTM D-882;.

Melt strength was measured by using a capillary rheometer fitted with a 2.1 mm diameter, 20:1 die with an entrance angle of approximately 45 degrees. After equilibrating the samples at 190° C. for 10 minutes, the piston was run at a speed of 2.54 cm/minute. The standard test temperature is 190° C. The sample is drawn uniaxially to a set of accelerating nips located 100 mm below the die with an acceleration of 2.4 mm/sec$^2$. The required tensile force is recorded as a function of the take-up speed of the nip rolls. The maximum tensile force attained during the test is defined as the melt strength. In the case of polymer melt exhibiting draw resonance, the tensile force before the onset of draw resonance was taken as the melt strength.

Dart impact is measured by the procedure of ASTM 1709, Condition A. Film puncture values are obtained using an Instron tensiometer equipped with a strain cell and an integrated digital display that provides force determinations. A single ply of a blown monolayer film having a thickness of 2 mils (0.051 mm) is mounted taut between the two halves of a circular holder constructed of aluminum and machined to couple the halves securely when they are joined together. The exposed film area when mounted in the holder is 4 inches (10.2 cm) in diameter. The holder is then affixed to the upper stationary jaw of the tensiometer. To the lower jaw of the tensiometer which is set to traverse upwardly, a hemispherical aluminum probe having a 12.5 mm diameter is affixed. The probe is aligned to traverse upwards through the center of the mounted film at a deformation rate of 250 mm/min. The force required to rupture the film is taken from the digital display and divided by the film thickness and the diameter of the probe to provide puncture resistance (sometimes referred to as "puncture") in kg-cm/cc or ft-lb/in$^3$.

Gloss, haze, and clarity are tested in accordance with ASTM D-1746, ASTM D-1003, and ASTM D-2457, respectively The hot tack of the films was measured using the "JB Instrument Hot Tack Test Method," which measures the force required to separate a heat seal before the seal has had a chance to fully cool (crystallize). This test simulates the filling of material into a pouch or bag before the seal has had a chance to completely cool.

The "JB Instrument Hot Tack Test Method" is a test method using a JB

| Instrument Hot Tack Tester according to the following conditions: | |
|---|---|
| Specimen Width: | 25.4 mm |
| Sealing Time: | 0.5 seconds |
| Sealing Pressure: | 0.27 N/mm/mm |
| Delay Time: | 0.2 seconds |
| Peel Speed: | 250 mm/seconds |
| Number of Samples per Temperature | 5 |
| Temperature Increments: | 5° C. |

The heat seal strength of sample films was measured using the "JB Instrument Heat Seal Strength Test Method," which is designed to measure the force required to separate a seal after the material has completely cooled to 23° C. The film samples were exposed to a relative humidity of 50 percent and a temperature of 23° C. for a minimum of 24 hours prior to testing.

The seal strength of the film samples was determined using an Instron Tensile

| Tester Model #1122 according to the following test conditions: | |
|---|---|
| Direction of Pull: | 90° to seal |
| Crosshead Speed: | 500 mm/minute |
| Full Scale Load: | 5 kg |
| Number of Samples/Threshold: | 1 percent of FSL |
| Break Criterion: | 80 percent |
| Gauge Length: | 2.0 inches (50.8 millimeters) |
| Sample Width: | 1.0 inch (25.4 millimeters) |

Heat seal initiation temperature is defined as the minimum temperature for 2 lb/in (0.4 Kg/cm) seal strength.

Base Polypropylene Resin

The base polypropylene used to make the MICP used in the following examples is isotactic polypropylene pellets, available from The Dow Chemical Company under the designation DC111. DC111 is an impact copolymer of propylene with 7–9 weight percent of ethylene, melt flow rate (MFR)=0.68 g/10 min and melt strength of approximately 12 cN.

Preparation of DPO-BSA Coupling Agent 4,4'-Oxydibenzenesulfonyl azide (hereinafter in the examples referred to as "DPO-BSA" or the "DPO-BSA coupling agent") used to make the MICP is prepared by the reaction of sodium azide with the corresponding bis(sulfonyl chloride) which is commercially available. An aqueous solution of sodium azide is added to an acetone solution of the bis(sulfonyl chloride), and the product is isolated by precipitation with excess water.

Preparation of DPO-BSA Concentrate Master Batch 52.25 lb/hr (23.75 Kg/hr) of AFFINITY* EG-8200, (1-octene based polyethylene plastomer having a 5 g/10 min MI, and a 0.87 g/cc density, commercially available from the Dow Chemical Company) and 2.75 lb/hr (1.25 Kg/hr) of DPO-BSA are separately fed into a 30 mm twin screw extruder manufactured by Werner & Pfleiderer, model # ZSK-30. The extruder has an inlet/feed throat and additional 5 zones following the inlet. The temperature profile for the extruder is shown below. These temperatures, except for the Melt Temperature, are barrel temperatures for the extruder. The resulting melt-extruded mixture of EG-8200 and DPO-BSA is passed through a strand die located at the exit of zone #5 and then through a cooling water bath (water temperature 20 C.) before being pelletized. The resulting DPO-BSA Concentrate Master Batch contains 5 weight percent DPO-BSA.

| Feed Throat | Room Temp |
|---|---|
| Zone #1 Temp (C.) | 100 |
| Zone #2 Temp (C.) | 100 |
| Zone #3 Temp (C.) | 100 |
| Zone #4 Temp (C.) | 100 |
| Zone #5/Die Temp (C.) | 120 |
| Melt Temp (C.) | 114 |
| Extruder Torque % | 60 |
| Extruder RPM | 170 |
| Die Pressure (psi) | 1900 |
| Output (lb/hr) | 55 |

Preparation of Modified Impact Copolymer Polypropylene (MICP)

The modified impact copolymer polypropylene (hereinafter "MICP") is produced as follows. 1547 lb/hr (703.2 Kg/hr) of DC111 is fed into a 92 mm twin screw extruder manufactured by Werner & Pfleiderer, model # ZSK-92, using an individual feeder inlet.

The DPO-BSA Concentrate Master Batch and additional DC111 are first fed into a blender with a weight ratio of 95.93 to 4.07 of DC111 to DPO-BSA Concentrate Master Batch to insure homogeneous mixing. The above mixture is then fed into the same 92 mm twin screw extruder as the DC111 via another individual feeder inlet at a rate of 123 lb/hr (55.9 Kg/hr). The feed rate of the DC111/DPO-BSA Concentrate is adjusted to introduce about 150 ppm of DPO-BSA based on the total weight of the polymers present. An additive package is added via a third feeder. The additive package includes a phenolic stabilizer available from Ciba Specialty Chemicals Company under the trade name IRGANOX 1010, a phosphite stabilizer available from Ciba Specialty Chemicals Company under the trade name IRGAFOS 168, calcium stearate, and glycerol monostearate. The feed rate of the additives is adjusted so that the resulting modified polymer resin has approximately 0.05 wt % of Calcium Stearate, approximately 0.06 wt % IRGANOX 1010, approximately 0.04 wt % IRGAFOS 168 and approximately 0.04 wt % glycerol monostearate.

The feed throat of the extruder is purged with nitrogen to reduce the oxygen level in the extruder. The temperature profile across the twin screw extruder from inlet to outlet is 200, 195, 180, 245, 245, 240, 240, 242, 242, and 253° C. The temperatures listed are barrel temperatures in the extruder. A die located at the outlet of the last zone should have a temperature of 250–270° C. to ensure the full reaction of the BSA and propylene polymer. The resulting melt-extruded polymer is passed though the die and then pelletized. The resulting coupled resin material is referred to herein as the MICP (0.35 MFR, 0.900 g/cc density, melt strength 71 cN, and approximately 7–9 weight percent ethylene content.

Polymer Resins

The resins used in the examples are described below.

1. DOWLEX* 2045A, 1 g/10 min MI, 0.920 g/cc density, MWD about 3.7, LLDPE resin comprising a 1-octene comonomer, prepared using a Zigler-Natta type catalyst and a solution polymerization process, commercially available from The Dow Chemical Company.
2. MICP, bisulphonyl azide modified impact copolymer, fabricated as described above.
3. Polyethylene Blend A, a 1 g/10 min MI, 0.916 g/cc in-reactor blend consisting of: (a) about 38 wt % of a substantially linear ethylene/1-octene copolymer having a 0.3 g/10 min MI and a 0.902 g/cc, prepared using a CGC type catalyst and a solution process; and (b) 62 wt % of a Ziegler-Natta catalyzed (solution process) ethylene/1-octene LLDPE having a 1.7 g/10 min MI and a 0.925 g/cc density.

Blending Dowlex 2045A/MICP

Dowlex 2045A/MICP are blended prior to introduction into the blown film extruder as follows:

DOWLEX 2045A and MICP are placed in a plastic drum in a weight ratio of 75 parts by weight MICP to 25 parts by weight DOWLEX 2045A. The drum is covered with a plastic liner. The above drum is then sealed and loaded onto a tumble blender and tumbled for at least 45 minutes to ensure good mixing.

Film Production Methods

Example A

A three layer film structure (A:B:A) is used for the coextrusion films of Tables 1 and 2. These film structures are made as described below. The three layer film structure is made on a blown film coextrusion line where Layer "A" (one outer layer) is extruded through an 8.0 inch (20.32 cm) diameter multi-channel annular die using 2.5 inch (6.35 cm) diameter extruder with a L/D ratio of 24:1 and a LDPE type screw. Layer A is made from 100% by weight Polyethylene Blend A; Layer "B" (the core layer) is extruded through an 8.0 inch (20.32 cm) diameter multi-channel annular die using a 2.5 inch (6.35 cm) diameter extruder with a L/D ratio of 24:1 and a barrier screw design with open channel and Maddock mixing tip. Layer B is made from a blend of 75 weight percent MICP and 25 weight percent DOWLEX 2045A; and the second layer "A" (the outer layer) is extruded through an 8.0 inch (20.32 cm) diameter multi-channel annular die using a 2 inch (5.08 cm) diameter extruder with a L/D ratio of 24:1 and a LDPE style screw with Maddock mixing tip. This second Layer A is also made from 100 percent by weight Polyethylene Blend A. The total configuration is set for a target output of about 200 pounds/hour (90 kg). The weight output ratios of the extruders is targeted at 20%/60%/20% for the A/B/A extruders unless stated otherwise. Typical polymer melt temperatures are targeted at 375° F./425° F./425° F./425° F. from inlet to outlet for the polymers that comprise layers A/B/A, with a target die temperature of 440° F. A 70 mil die gap is used for all the dies. The produced films are air blown to a 2.5:1 blow-up ratio (BUR) and air-quenched to produce the three layer A/B/A multilayer film.

Tables 1 and 2 show the properties for the films produced. As can be seen from Tables 1 and 2, the inventive coextruded film structures exhibit excellent Secant Modulus, Dart Impact, Elmendorf Tear, heat seal strength and hot tack together will excellent optical properties.

TABLE 1

|  | Coex A/B/A | Coex A/B/A |
| --- | --- | --- |
| Avg Thickness, (mils) | 2.0 | 0.8 |
| Avg Haze Value, % | 9 | 5 |
| Avg Gloss 45 deg, % | 69 | 72 |
| MD-Avg 2% SECANT MODULUS, (psi) | 73,100 | 73,004 |
| CD-Avg. 2% SECANT MODULUS, (psi) | 72,661 | 75,958 |
| Dart Impact (g) | 344 | 126 |
| Avg Elmendorf Tear MD (g) | 103 | 64 |
| Avg Elmendorf Tear CD (g) | 385 | 143 |
| Max. Heat Seat Strength (lb/in) | 5.7 | 3.5 |
| Max. Hot Tack (N) | 11.0 | 6.5 |

TABLE 2

| Material | A/B/A Coextrusion |
| --- | --- |
| Average Thickness (mil) | 5.3 |
| Dart Impact (g) | 838 |
| 2% Secant Modulus (psi) MD | 69,055 |
| 2% Secant Modulus (psi) CD | 66,376 |
| Elmendorf Tear MD (g) | 473 |
| Elmendorf Tear CD (g) | 478 |

Example B

Three layer film structure (A:B:A) are used for the coextrusion films of Table 3. These film structures are made as described below. All the coextruder film structure listed in Table 3 are about 2.0 mils in thickness. The three layer film structure is made on a blown film coextrusion line where Layer "A" (one outer layer) is extruded through an 8.0 inch (20.32 cm) diameter multi-channel annular die using 2.5 inch (6.35 cm) diameter extruder with a L/D ratio of 24:1 and a LDPE type screw. Layer A is made from 100% by weight Polyethylene Blend A; Layer "B" (the core layer) is extruded through an 8.0 inch (20.32 cm) diameter multi-channel annular die using a 2.5 inch (6.35 cm) diameter extruder with a L/D ratio of 24:1 and a barrier screw design with open channel and Maddock mixing tip. Layer B is made from a blend of MICP and Polyethylene Blend A, the weight percentage of Polyethylene Blend A is provided in Table 3, for all the film samples, MICP makes up the rest of the core; and the second layer "A" (the outer layer) is extruded through an 8.0 inch (20.32 cm) diameter multi-channel annular die using a 2 inch (5.08 cm) diameter extruder with a L/D ratio of 24:1 and a LDPE style screw with Maddock mixing tip. This second Layer A is also made from 100 percent by weight Polyethylene Blend A. The total configuration is set for a target output of about 200 pounds/hour (90 kg/hour).

The weight percent of the core as a percentage of the total weight for each film sample is provided in Table 3. The skins make up the rest of the weight for each film sample. The extruders are operated so that each skin makes up approximately the same weight percent of the film structure as the other. For example, for sample number 1, the core makes up 20 weight percent of the total structure and contains 100% MICP; each skin layer is made from 100% Polyethylene Blend A and each skin makes up approximately 40 weight percent of the total film structure.

Typical polymer melt temperatures are targeted at 375° F./425° F./425° F./425° F. from inlet to outlet for the polymers that comprise layers A/B/A, with a target die temperature of 440° F. A 70 mil die gap is used for all the dies. The output rates of the individual extruders are adjusted to get the desired individual layer weight ratios. The produced films are air blown to a 2.5:1 blow-up ratio (BUR) and air-quenched to produce the three layer A/B/A multilayer film.

Table 3 shows the properties for the films produced. As can be seen from Table 3, the inventive coextruded film structures exhibit excellent Secant Modulus, Dart Impact, Elmendorf Tear, heat seal strength and hot tack together will excellent optical properties. Also as can be seen from Table 3, coextruded film structures where the core makes up less than 50 weight percent of the structure and where the coupled propylene polymer makes up less than 25 weight percent of the total film structure show excellent values for Elmendorf tear, dart impact and puncture.

Example C

Figure 2:
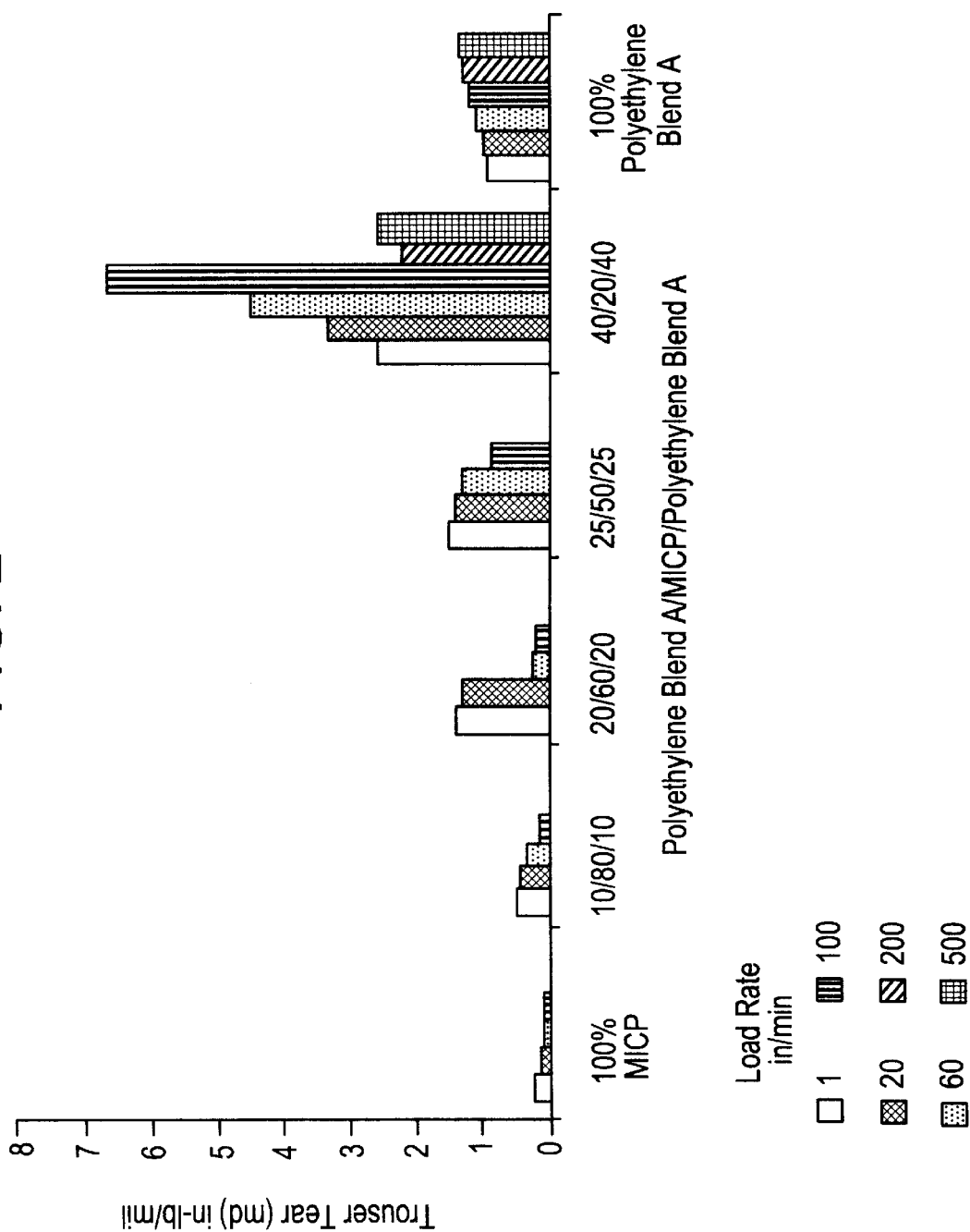
FIG. 2 shows the dependence Trouser tear (md values only) on the rate at which the tear is made for several different coextruded A/B/A type film structures. The weight percentage for each layer of each A/B/A structure is indicated along the x-axis and the normalized Trouser tear is measured along the y-axis.

Three layer film structure (A:B:A) are used for the coextruded films of FIGS. 1, 2, and 3. These film structures are made as described below. All the coextruder film structure used to develop the data for FIGS. 1, 2, and 3 are about 2.0 mils in thickness. The three layer film structures are made on a blown film coextrusion line where Layer "A" (one outer layer) is extruded through an 8.0 inch (20.32 cm) diameter multi-channel annular die using 2.5 inch (6.35 cm) diameter extruder with a L/D ratio of 24:1 and a LDPE type screw. Layer A is made from 100% by weight Polyethylene Blend A; Layer "B" (the core layer) is extruded through an 8.0 inch (20.32 cm) diameter multi-channel annular die using a 2.5 inch (6.35 cm) diameter extruder with a L/D ratio of 24:1 and a barrier screw design with open channel and Maddock mixing tip. Layer B is made from 100% MICP; and the second layer "A" (the other outer layer) is extruded through an 8.0 inch (20.32 cm) diameter multi-channel annular die using a 2 inch (5.08 cm) diameter extruder with a L/D ratio of 24:1 and a LDPE style screw with Maddock mixing tip. This second Layer A is also made from 100 percent by weight Polyethylene Blend A. The total configuration is set for a target output of about 200 pounds/hour (90 kg/hour).

The weight percent of the three layers of the structure are indicated along the x-axis of FIGS. 1 and 2. For example, in a structure indicated along the x-axis to be 10/80/10, each Layer A makes up about 10 weight percent of the overall structure and Layer B makes up about 80 weight percent of the overall structure.

Typical polymer melt temperatures are targeted at 375° F./425° F./425° F./425° F. from inlet to outlet for the polymers that comprise layers A/B/A, with a target die temperature of 440° F. A 70 mil die gap is used for all the dies. The output rates of the individual extruders are adjusted to get the desired individual layer weight ratios. The produced films are air blown to a 2.5:1 blow-up ratio (BUR) and air-quenched to produce the three layer A/B/A multilayer film.

FIGS. 1 and 2 show the normalized Trouser tear values for various coextruded film structures and a monolayer film comprised of 100% MICP. All the films of FIGS. 1 and 2 are 2 mil thick. As can be seen from FIGS. 1 and 2, film structures having a MICP core that is less than about 50 weight percent of the overall structure exhibit excellent Trouser tear properties compared with monolayer film structures comprised of MICP alone (using equipment and procedures similar to those for making layer B (core layer) of the multilayer films described above), three-layer coextruded film structures made with 100% Polyethylene Blend A and having 25/50/25 weight percent per layer, and other coextruded film structures having a MICP core which makes up greater than 50 weight percent of the entire structure.

TABLE 3

| Sample Number | Wt % Polyethylene Blend A in Core | Core wt % | MD-2% Secant Modulus (psi) | CD-2% Secant Modulus (psi) | MD-Elmendorf Tear (g/mil) | CD-Elmendorf Tear (g/mil) | Dart Impact Condition A | Puncture (ft-lb/in$^3$) | 45° Gloss (%) | Haze (%) | Seal Initiation Temperature (° C.) | Maximum Heat Seal Strength (lb/in) |
|---|---|---|---|---|---|---|---|---|---|---|---|---|
| 1  | 0%  | 20%  | 45280  | 43548 | 276 | 373 | 658  | 232 | 81.3 | 6.8  | 93.3  | 4.4 |
| 2  | 0%  | 50%  | 74928  | 69506 | 47  | 159 | 316  | 220 | 81.0 | 5.9  | 92.2  | 5.2 |
| 3  | 0%  | 80%  | 103752 | 92238 | 13  | 93  | 292  | 165 | 77.9 | 5.3  | 92.7  | 4.5 |
| 4  | 17% | 20%  | 40327  | 41688 | 359 | 392 | 782  | 251 | 83.1 | 5.0  | 92.8  | 4.2 |
| 5  | 17% | 50%  | 64188  | 62405 | 43  | 155 | 326  | 226 | 80.1 | 5.4  | 92.1  | 6.0 |
| 6  | 17% | 70%  | 79814  | 75013 | 28  | 163 | 286  | 174 | 80.4 | 4.4  | 94.0  | 5.9 |
| 7  | 17% | 100% | 101784 | 90971 | 15  | 103 | 244  | 141 | 10.6 | 57.0 | 136.0 | 8.3 |
| 8  | 33% | 20%  | 36134  | 37829 | 363 | 343 | >850 | 251 | 82.3 | 5.8  | 92.5  | 4.1 |
| 9  | 33% | 50%  | 45391  | 49315 | 227 | 342 | 432  | 123 | 80.0 | 6.2  | 92.4  | 5.2 |
| 10 | 33% | 70%  | 61838  | 60070 | 66  | 280 | 274  | 197 | 81.1 | 5.3  | 92.7  | 5.6 |
| 11 | 33% | 100% | 77636  | 75809 | 28  | 125 | 112  | 137 | 14.1 | 47.3 | 130.3 | 9.4 |
| 12 | 50% | 20%  | 32185  | 34791 | 420 | 603 | >850 | 236 | 81.6 | 5.6  | 92.3  | 4.2 |
| 13 | 50% | 50%  | 45503  | 40705 | 258 | 394 | 540  | 237 | 80.5 | 5.5  | 91.1  | 4.5 |
| 14 | 50% | 70%  | 52292  | 49845 | 205 | 367 | 370  | 209 | 77.9 | 5.7  | 92.3  | 5.5 |
| 15 | 75% | 20%  | 29338  | 32260 | 462 | 507 | >850 | 278 | 79.4 | 6.5  | 93.0  | 3.7 |
| 16 | 75% | 50%  | 37910  | 38711 | 401 | 407 | 850  | 280 | 81.4 | 5.1  | 93.0  | 4.4 |
| 17 | 75% | 70%  | 43570  | 40424 | 383 | 399 | 786  | 216 | 76.4 | 5.1  | 93.1  | 4.1 |

We claim:

1. A coextruded film comprising:
   (a) at least one layer comprising at least one coupled propylene polymer; and
   (b) at least one layer comprising an in-reactor blend of linear low density polyethylene and a substantially linear polyethylene or a homogeneously branched linear polyethylene, wherein component (a) comprises less than 50 weight percent of the coextruded film.

2. The film of claim 1, wherein component (a) comprises less than 30 weight percent of the coextruded film.

3. The film of claim 1, wherein component (a) comprises less than 25 weight percent of the coextruded film.

4. The film of claim 1, wherein the component (a) comprises less than 20 weight percent of the coextruded film.

5. The film of claim 1, wherein the at least one coupled propylene polymer is made by reacting an impact propylene copolymer with a coupling agent.

6. The film of claim 5, wherein the coupling agent is a poly (sulfonyl azide) and the melt strength of the coupled propylene polymer is at least 20 cN.

7. The film of claim 1, wherein the in-reactor blend of (b) has a melt index of at least 0.1 g/10 min and less than 15 g/10 min.

8. The film of claim 7, wherein the in-reactor blend of (b) has a melt index of at least 0.3 g/10 min.

9. The film of claim 7, wherein the in-reactor blend of (b) has a melt index of less than 10 g/10 min.

10. The film of claim 7, wherein the in-reactor blend of (b) has a melt index of at least 0.5 g/10 min and less than 4 g/10 min.

11. The film of claim 10, wherein the in-reactor blend of (b) has a density of at least 0.87 g/cc and less than 0.95 g/cc.

12. The film of claim 11, wherein the in-reactor polyethylene blend of (b) has a density of at least 0.90 g/cc and less than 0.925 g/cc.

13. The film of claim 11, wherein the density of the substantially linear polyethylene fraction or homogeneously branched linear polyethylene fraction is within about ±0.015 g/cc of the density of the coupled propylene polymer of (a).

14. The film of claim 13, wherein the density of the substantially linear polyethylene fraction or homogeneously branched linear polyethylene fraction is between about 0.885 g/cc and about 0.915 g/cc.

15. The film of claim 11, wherein the melt index of the substantially linear polyethylene fraction or homogeneously branched linear polyethylene fraction is less than 0.8 g/10 min.

16. The film of claim 9, wherein the melt index of the LLDPE fraction of the in-reactor blend of (b) is between about 1.0 g/10 min and about 10.0 g/10 min.

17. The film of claim 9, wherein the melt index of the LLDPE fraction of the in-reactor blend of (b) is between about 1.2 g/10 min and about 4.0 g/10 min.

18. The film of claim 1, wherein component (a) further comprises at least one ethylene polymer.

19. The film of claim 18, wherein the at least one ethylene polymer comprising component (a) is selected from the group consisting of: low density polyethylene, LLDPE, high density polyethylene, substantially linear polyethylene, homogeneously branched linear polyethylene, and blends thereof.

20. The film of claim 18, wherein the at least one ethylene polymer comprising component (a) is an in-reactor blend of linear low density polyethylene and a substantially linear polyethylene or a homogeneously branched linear polyethylene.

21. A coextruded film comprising:
   (a) at least one layer comprising at least one coupled propylene copolymer, the at least one coupled propylene copolymer having a melt strength of at least 40 cN, a melt flow rate of at least 0.1 g/10 min and less than 2.0 g/10 min; and
   (b) at least one layer comprising an in-reactor blend of linear low density polyethylene and a substantially linear polyethylene or a homogeneously branched linear polyethylene, wherein the in-reactor blend of (b) has a melt index of at least 0.1 g/10 min and less than 15 g/10 min.

22. The film of claim 21, wherein the in-reactor blend of (b) has a density of at least 0.87 g/cc and less than 0.95 g/cc, the density of the substantially linear polyethylene fraction or homogeneously branched linear polyethylene fraction is between about 0.885 g/cc and about 0.915 g/cc and wherein the melt index of the substantially linear polyethylene fraction or homogeneously branched linear polyethylene fraction is less than 0.8 g/10 min.

23. The film of claim 22, wherein the melt index of the LLDPE fraction of the in-reactor blend of (b) is between about 1.0 g/10 min and about 10.0 g/10 min.

24. The film of claim 22, wherein the melt index of the LLDPE fraction of the in-reactor blend of (b) is between about 1.2 g/10 min and about 4.0 g/10 min.

25. The film of claim 24, wherein the coupled propylene copolymer of (a) is a coupled impact propylene copolymer made by reacting an impact propylene copolymer with a coupling agent.

26. The film of claim 25, wherein the coupling agent is a bis (sulfonyl azide).

27. The film of claim 21, wherein the layer of (a) comprises less than 30 weight percent of the coextruded film.

28. The film of claim 21, wherein component (a) comprises about 20 weight percent or less of the coextruded film.

29. The film of claim 21, wherein the coupled propylene copolymer of (a) is a coupled impact propylene copolymer and the layer of (a) further comprises an in-reactor blend of linear low density polyethylene and a substantially linear polyethylene or a homogeneously branched linear polyethylene.

30. The film of claim 29, wherein component (a) comprises less than 50 weight percent of the coextruded film and the coupled impact propylene copolymer comprises about 50 weight percent or less of component (a).

31. The film of claim 29, wherein the coupled impact propylene copolymer comprises less than 30 weight percent of component (a).

32. The film of claim 29, wherein component (a) comprises less than 30 weight percent of the coextruded film and the coupled impact propylene copolymer comprises less than 25 weight percent of component (a).

33. The film of claim 29, wherein component (a) comprises less than 25 weight percent of the coextruded film and the coupled impact propylene copolymer comprises less than 25 weight percent of component (a).

34. The film of claim 21, wherein component (a) comprises less than 50 weight percent of the coextruded film and the coupled propylene copolymer comprises at least 80 weight percent of component (a).

35. The film of claim 34, wherein component (a) comprises less than 30 weight percent of the coextruded film and the coupled propylene copolymer comprises about 100 weight percent of component (a).

36. The film of claim 21 having at least one core layer comprising component (a) sandwiched between at least two outer layers, wherein the outer layers comprise component (b).

37. The film of claim 34 having at least one core layer comprising component (b) sandwiched between at least two outer layers, wherein at least one of the outer layers comprise component (a).

38. The film of claim 37 which is used for grease resistant applications.

39. The film of claim 38 which is used for packaging food stuffs.

40. A coextruded film comprising:
  (a) at least one layer comprising at least one coupled impact propylene copolymer coupled by reaction with a coupling agent and having a melt strength of at least 40 cN; and
  (b) at least one layer comprising an in-reactor blend having a melt index of at least 0.3 g/10 min and less than 10 g/10 min and having a density of at least 0.88 g/cc and less than 0.930 g/cc, the in-reactor blend comprised of a linear low density polyethylene and a substantially linear polyethylene or a homogeneously branched linear polyethylene, wherein the film exhibits a mechanical properties balance.

41. The film of claim 40, wherein the in-reactor blend has a melt index of at least 0.5 g/10 min and less than 6 g/10 min and has a density of at least 0.90 g/cc and less than 0.925 g/cc.

42. The film of claim 41, wherein the in-reactor blend has a melt index of at least 0.5 g/10 min and less than 4 g/10 min, component (a) comprises less than 30 weight percent of the coextruded film, and the coupled impact propylene copolymer comprises about 50 weight percent or less of component (a).

43. The film of claim 41, wherein the film exhibits: Elmendorf tear resistance in either the cross direction or machine direction of at least 300 g/mil, Dart impact of at least 500 g, and puncture resistance of at least 200 ft-lb/in$^3$.

44. The film of claim 43, wherein the in-reactor blend has a melt index of at least 0.5 g/10 min, component (a) comprises less than 50 weight percent of the coextruded film, and the coupled impact propylene copolymer comprises about 50 weight percent or less of component (a).

45. The film of claim 44, which is a heat sealable film having a seal initiation temperature less than 100° C. and a maximum heat seal strength of at least 3 lb/in.

46. The film of claim 44, which is a heat sealable film having a seal initiation temperature less than 94° C. and a maximum heat seal strength of at least 3.5 lb/in.

* * * * *